(12) United States Patent
Fukaya et al.

(10) Patent No.: US 7,652,900 B2
(45) Date of Patent: Jan. 26, 2010

(54) INVERTER TYPE AC GENERATOR WITH A ZERO-CROSSING DETECTION CIRCUIT USED TO PROVIDE A SYNCHRONIZED OPERATION AND METHOD OF OPERATING THE SAME

(75) Inventors: Mitsuo Fukaya, Shizuoka-ken (JP); Takashi Uchino, Shizuoka-ken (JP)

(73) Assignee: Yamaha Motor Power Products Kabushiki Kaisha, Shizuoka-Ken (JP)

( * ) Notice: Subject to any disclaimer, the term of this patent is extended or adjusted under 35 U.S.C. 154(b) by 189 days.

(21) Appl. No.: 11/350,299

(22) Filed: Feb. 7, 2006

(65) Prior Publication Data

US 2006/0193158 A1 Aug. 31, 2006

(30) Foreign Application Priority Data

Feb. 7, 2005 (JP) .............................. 2005-031052

(51) Int. Cl.
*H02M 7/5387* (2007.01)
(52) U.S. Cl. ........................... 363/132; 363/98; 363/165
(58) Field of Classification Search .................. 363/17, 363/98, 132, 165; 323/235
See application file for complete search history.

(56) References Cited

U.S. PATENT DOCUMENTS

| | | | |
|---|---|---|---|
| 4,119,861 A | 10/1978 | Gocho | |
| 4,163,187 A | 7/1979 | Thomas | |
| 4,259,845 A * | 4/1981 | Norbeck ...................... | 62/209 |
| 4,456,870 A | 6/1984 | Rodari | |
| 4,465,943 A | 8/1984 | Risberg | |
| 4,549,106 A | 10/1985 | Stroud | |
| 4,654,577 A | 3/1987 | Howard | |
| 4,680,529 A | 7/1987 | Komurasaki et al. | |
| 4,689,545 A | 8/1987 | Komurasaki et al. | |
| 4,786,852 A | 11/1988 | Cook | |
| 4,866,592 A * | 9/1989 | Fujii et al. ..................... | 363/98 |
| 4,967,334 A | 10/1990 | Cook et al. | |
| 5,012,781 A | 5/1991 | Yokoyama et al. | |
| 5,013,929 A | 5/1991 | Dhyanchand | |
| 5,015,941 A | 5/1991 | Dhyanchand | |
| 5,023,572 A * | 6/1991 | Caldwell et al. .............. | 331/10 |
| 5,068,590 A | 11/1991 | Glennon et al. | |
| 5,086,266 A | 2/1992 | Shiga et al. | |

(Continued)

FOREIGN PATENT DOCUMENTS

EP    0 539 982 A2    5/1993

(Continued)

*Primary Examiner*—Edward Tso
*Assistant Examiner*—Arun Williams
(74) *Attorney, Agent, or Firm*—Knobbe Martens Olson & Bear, LLP

(57) ABSTRACT

An inverter type AC generator includes an inverter circuit converting a DC output into AC output of a predetermined frequency and supplying the AC output to a load via a load line in order to improve the quality of an AC output waveform at least in parallel operations. The inverter AC generator includes a zero-crossing detection circuit for detecting a timing of zero-crossings of an AC output voltage waveform on the output line. A controller generates a drive signal in synchronization with the timing of the detected zero-crossings, when a predetermined number of zero-crossings have been detected, and drives the inverter to perform a synchronized operation process.

15 Claims, 8 Drawing Sheets

U.S. PATENT DOCUMENTS

| | | | |
|---|---|---|---|
| 5,172,009 | A | 12/1992 | Mohan |
| 5,257,180 | A * | 10/1993 | Sashida et al. ................. 363/71 |
| 5,258,700 | A | 11/1993 | Shimizu et al. |
| 5,262,769 | A * | 11/1993 | Holmes ..................... 340/7.42 |
| 5,281,905 | A | 1/1994 | Dhyanchand et al. |
| 5,334,877 | A | 8/1994 | Mohan et al. |
| 5,343,079 | A | 8/1994 | Mohan et al. |
| 5,389,824 | A | 2/1995 | Moroto et al. |
| 5,397,975 | A | 3/1995 | Syverson |
| 5,414,609 | A * | 5/1995 | Levran et al. ................. 363/17 |
| 5,432,383 | A | 7/1995 | Kawamura |
| 5,469,365 | A * | 11/1995 | Diekema et al. .............. 702/62 |
| 5,493,200 | A | 2/1996 | Rozman et al. |
| 5,559,686 | A | 9/1996 | Patel et al. |
| 5,581,168 | A | 12/1996 | Rozman et al. |
| 5,594,322 | A | 1/1997 | Rozman et al. |
| 5,625,539 | A * | 4/1997 | Nakata et al. ................. 363/17 |
| 5,650,713 | A | 7/1997 | Takeuchi et al. |
| 5,663,627 | A * | 9/1997 | Ogawa ....................... 318/803 |
| 5,747,971 | A | 5/1998 | Rozman et al. |
| 5,767,591 | A | 6/1998 | Pinkerton |
| 5,774,351 | A * | 6/1998 | Hsieh et al. ................. 363/132 |
| 5,786,642 | A | 7/1998 | Wilhelm |
| 5,811,960 | A * | 9/1998 | Van Sickle et al. ............. 322/4 |
| 5,856,712 | A | 1/1999 | Suzuki et al. |
| 5,969,435 | A | 10/1999 | Wilhelm |
| 6,018,200 | A | 1/2000 | Anderson et al. |
| 6,018,233 | A | 1/2000 | Glennon |
| 6,134,124 | A | 10/2000 | Jungreis et al. |
| 6,157,168 | A | 12/2000 | Malik |
| 6,175,217 | B1 | 1/2001 | Da Ponte et al. |
| 6,215,272 | B1 | 4/2001 | Ohara et al. |
| 6,326,702 | B1 | 12/2001 | Yonekura et al. |
| 6,369,461 | B1 | 4/2002 | Jungreis et al. |
| 6,384,559 | B2 | 5/2002 | Egami |
| 6,486,639 | B1 | 11/2002 | Montret et al. |
| 6,487,096 | B1 | 11/2002 | Gilbreth et al. |
| 6,563,246 | B1 | 5/2003 | Kajiura et al. |
| 6,603,227 | B2 | 8/2003 | Rose, Sr. |
| 6,605,928 | B2 | 8/2003 | Gupta et al. |
| 6,703,719 | B1 | 3/2004 | McConnell |
| 6,707,170 | B2 | 3/2004 | Fukaya |
| 6,737,762 | B2 | 5/2004 | Koenig |
| 6,771,522 | B2 * | 8/2004 | Hayashi et al. ............... 363/71 |
| 6,819,007 | B2 | 11/2004 | Fukaya |
| 6,943,531 | B2 | 9/2005 | Fukaya |
| 7,402,967 | B2 | 7/2008 | Kurosawa |
| 2003/0080622 | A1 * | 5/2003 | Koenig ....................... 307/64 |
| 2003/0198065 | A1 * | 10/2003 | Hayashi et al. ............... 363/35 |
| 2004/0066094 | A1 | 4/2004 | Suzuki et al. |
| 2005/0047176 | A1 * | 3/2005 | Fukumoto .................... 363/17 |

FOREIGN PATENT DOCUMENTS

| | | |
|---|---|---|
| EP | 0 561 623 A2 | 9/1993 |
| FR | 2 674 382 A1 | 9/1992 |
| JP | 56049699 A | 5/1981 |
| JP | 60-187721 | 9/1985 |
| JP | 60-257795 | 12/1985 |
| JP | 3215196 | 9/1991 |
| JP | 5-18285 | 1/1993 |
| JP | 5095637 A | 4/1993 |
| JP | 62-77833 | 4/1994 |
| JP | 63-11713 A | 11/1994 |
| JP | 10108427 A | 4/1998 |
| JP | 2934675 | 8/1999 |
| JP | 2000-12059 | 1/2000 |
| JP | 2000-278998 | 10/2000 |
| JP | 2001-211695 | 8/2001 |
| JP | 2002-118981 | 4/2002 |
| WO | WO 99-26332 | 5/1999 |

* cited by examiner

INVERTER TYPE AC GENERATOR WITH A ZERO-CROSSING DETECTION CIRCUIT USED TO PROVIDE A SYNCHRONIZED OPERATION AND METHOD OF OPERATING THE SAME

CROSS-REFERENCE TO RELATED APPLICATIONS

The present application is based on and claims priority under 35 U.S.C. § 119 to Japanese Patent Application No. 2005-031052, filed on Feb. 7, 2005, the entire contents of which is expressly incorporated by reference herein and should be considered a part of this specification.

BACKGROUND OF THE INVENTION

1. Field of the Invention

The present invention relates to an AC generator provided with an inverter. More particularly, the invention relates to an inverter type AC generator that converts a DC output from a DC power source generating unit, which can generate DC power from any energy other than electricity, into an AC output of a certain frequency and is capable of supplying the AC output to a load via an output line.

2. Description of the Related Art

Japanese Publication No. JP-A-S62-77833 illustrates a conventional AC coupling system, in which an electric power converter converts DC power from a DC power source into AC power, which can be connected to an electric power system via a switch. The AC coupling system is designed to allow a synchronization detection circuit to detect an AC voltage of the electric power system and to compare the phase of such AC voltage with a phase of a coupling-point detected voltage on the AC converter side. If both voltage phases match, the AC coupling system is designed to output an operation signal to the switch via a switch operation circuit, thereby turning the switch on. The electric power converter is designed to be driven in synchronization with an AC voltage of the electric power system via a PLL circuit having a phase reference signal and a voltage control circuit.

However, the AC/DC electric power converter described above only controls the voltage phase on its side to match the voltage phase of the electric power system. When both AC output frequencies, including cycles, are mismatched, a high-quality AC output waveform cannot be provided. In addition, since the electric power converter starts the automatic control of the voltage phase at the time the switch is turned on, the phases may not match at an instant when the automatic control starts. In such a case, overcurrent flows-in toward the electric power converter as cross-current via a connecting portion with the electric power system. This may generate an arc in the connecting portion, as well as lead to deficiencies due to heat breakage or deterioration over time.

SUMMARY OF THE INVENTION

In accordance with one aspect of the present invention, an inverter type AC generator is provided that outputs an inverter drive signal synchronized to the timing of a zero-crossing and frequency (including a cycle) of an AC output in order to improve the quality of an the AC output waveform at least when AC generators operate in parallel.

In accordance with another aspect of the present invention, an inverter type AC generator is provided for converting DC output from a DC power source generating unit into AC output of a predetermined frequency, and which is capable of supplying the AC output to a load via an output line. The AC generator comprises a zero-crossing detection circuit configured to detect at least one zero-crossing of an AC output waveform on the output line. The AC generator also comprises a controller configured to generate a drive signal in synchronization with a timing of the at least one zero-crossing detected by the zero-crossing detection circuit when the at least one detected zero-crossing meets a predetermined condition, the controller configured to drive the inverter via the drive signal to perform a synchronized operation process.

In an additional aspect of the present invention, an inverter type AC generator is provided for converting DC output from a DC power source generating unit into AC output of a predetermined frequency,. and which is capable of supplying the AC output to a load via an output line. The inverter type AC generator comprises a zero-crossing detection circuit configured to detect at least one zero-crossing of an AC output waveform on the output line. The inverter type AC generator also comprises means for generating a drive signal synchronized with a timing of the at least one zero-crossing detected by the zero-crossing detection circuit when the at least one detected zero-crossing meets a predetermined condition. Said means drives the inverter via the drive signal to perform a synchronized operation process.

In another aspect of the present invention, a method for synchronizing the operation of an inverter type AC generator is provided. The method comprises monitoring a frequency of an AC output waveform. The method also comprises generating a drive signal in synchronization with said frequency when a predetermined condition is met, and driving an inverter with said drive signal to perform a synchronized operation process.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 9 figures.

DETAILED DESCRIPTION OF THE PREFERRED EMBODIMENT

As used herein, "parallel operations" refers to the operation of at least two AC generators in parallel, wherein at least one of the AC generators is an inverter type AC generator, as described in the embodiments below. In contrast, "single operation" refers to the independent operation of an inverter type AC generator, according to any of the embodiments described below.

Figure 1:
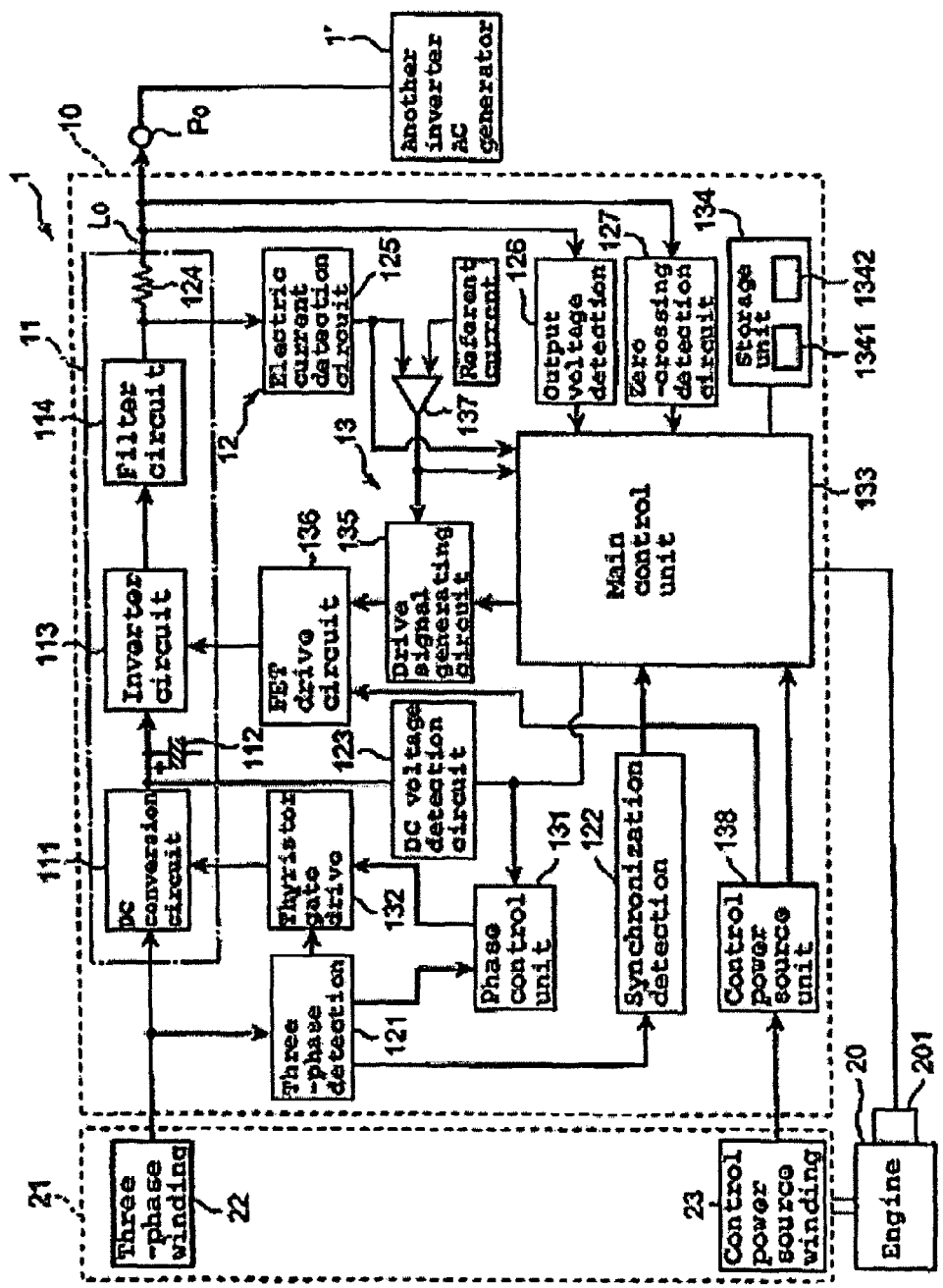
FIG. 1 is a block diagram of one embodiment of an inverter type AC generator.
Figure 2:
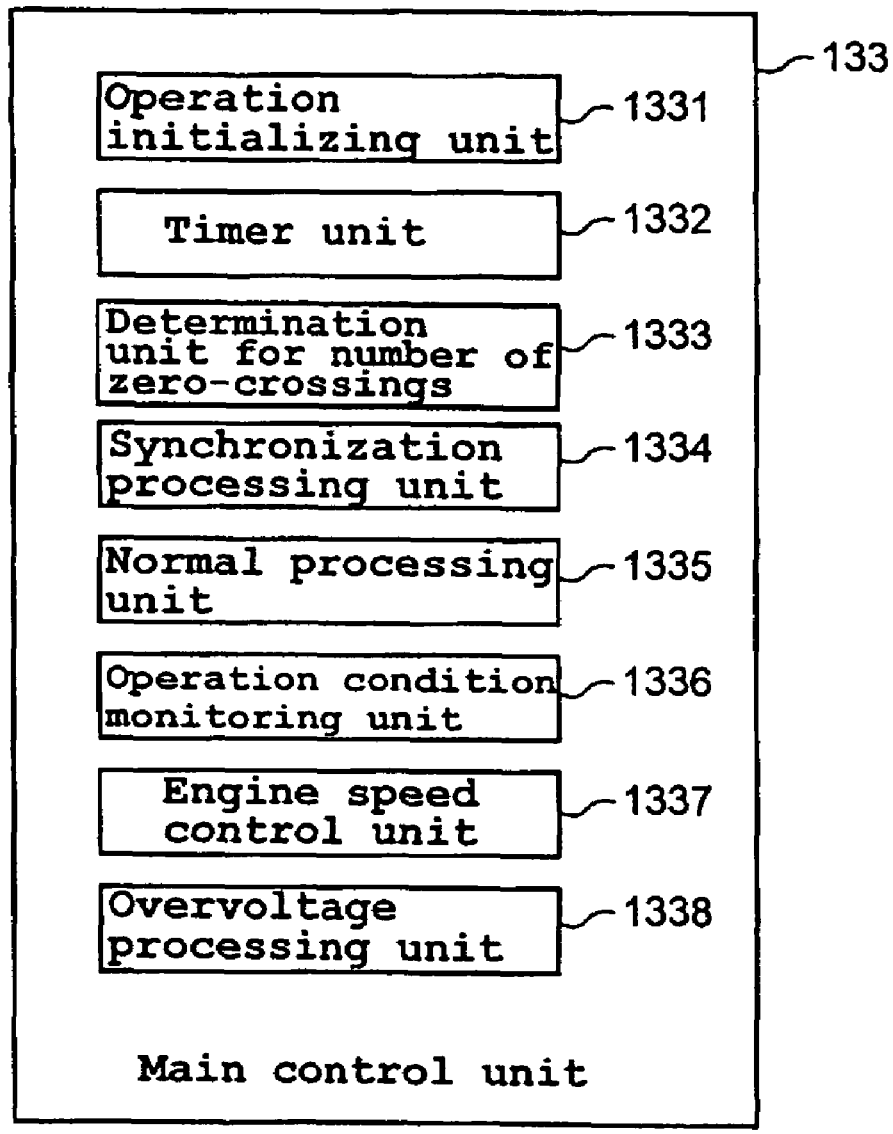
FIG. 2 is block diagram of a configuration for a main control unit of the inverter type AC generator in FIG. 1.
Figure 3:
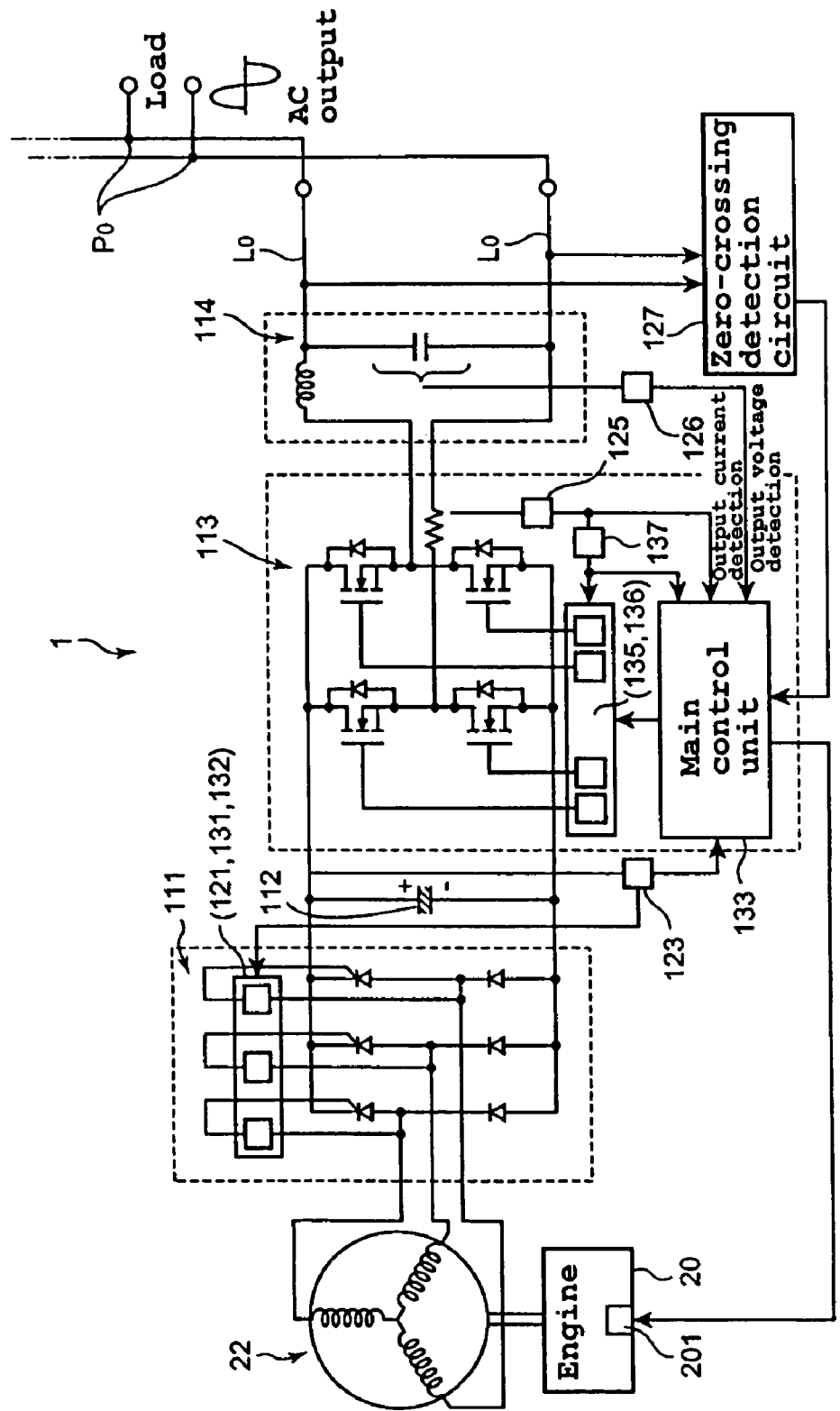
FIG. 3 is a circuit block diagram of the inverter type AC generator of FIG. 1.

FIG. 1 is a block diagram of one embodiment of an inverter type AC generator. FIG. 2 is a block diagram of a configuration for a main control unit of one embodiment of the inverter type AC generator. In the illustrated embodiment the configuration is a software configuration. However, in other embodiments, the configuration can be a hardware configuration or a combination of software and hardware. FIG. 3 is a circuit block diagram of the inverter type AC generator in FIG. 1.

FIG. 1 illustrates one embodiment of an inverter type AC generator 1. The inverter type AC generator 1 includes an inverter AC generating unit 10 connected to a power supply, for example an engine 20. The inverter type AC generator 1 is preferably designed to use the driving force of the power supply, for example a rotational driving power of the engine 20, to generate AC power, as required. The AC generating unit 10 can be used to control the driving force of the power supply or to regulate the amount of power transferred from the power supply to the inverter AC generator.

In the illustrated embodiment, the engine 20 is preferably an internal combustion engine fueled by gasoline. However, the engine may be driven using other fuel types. Preferably, the engine 20 has a throttle opening regulating unit 201, which can include a motor for regulating the opening of a throttle valve designed to change an engine operation speed or rotational speed. The throttle opening regulating unit 201 regulates the opening of the throttle valve and is preferably controlled by the inverter AC generating unit 10.

Preferably, an output section of the engine 20 is connected to a generator with a required number of phases, such as, for example, a three-phase AC generator 21. In a preferred embodiment, the generator 21 has a plurality of magnets on a rotor side (not shown) disposed around an output rotational shaft of the engine 20 (or another rotational shaft connected thereto), a three-phase winding 22 on a stator side, which crosses a magnetic flux from each of the plural magnets, and a single-phase auxiliary winding 23 for obtaining power to operate the inverter AC generating unit 10.

The inverter AC generating unit 10 preferably includes an inverter circuit section 11, with its input side connected to the three-phase winding 22 and its output side connected to an output line Lo. The inverter AC generating unit 10 also includes a detection circuit section 12 connected to the input side of the inverter circuit section 11 and the output line Lo, the detection circuit section 12 detecting electric power conditions at the input side and the output line Lo. The unit 10 also includes an operation control unit or controller 13 for controlling operation of the inverter circuit section 11 based on the detection results from the detection circuit section 12.

In the illustrated embodiment, the inverter circuit section 11 includes a DC conversion circuit 111, with the three-phase winding 22 inducing each phase thyristor of a bridge connection for rectifying three-phase AC power to convert it into DC power. A voltage stabilizing circuit 112, (such as, for example, a capacitor) preferably smoothes the converted DC power. An inverter circuit 113, which can include a field-effect transistor (FET), converts the smoothed DC power into AC power of a certain frequency. A filter circuit 114, of the inverter circuit section 11 preferably rectifies an inverter output waveform to a sine waveform. However, in other embodiments, the filter circuit 114 can rectify the inverter output waveform into other waveform types. The output line Lo is preferably connected to a load (not shown) via a connecting member Po. In the illustrated embodiment, the generator 21, the DC conversion circuit 111 and the voltage stabilizing circuit 112 constitute a DC power source generating unit.

As shown in FIG. 1, the inverter type AC generator 1 and another inverter type AC generator 1' can be connected in parallel to the load (not shown) via the connecting member Po, which allows the two inverter type AC generator units 1, 1' to operate in parallel. However, any number of inverter type AC generators can be connected in parallel. In one embodiment the two inverter type AC generator units 1 can have the same configuration. In another embodiment, the two inverter type AC generator units 1, 1' can be configured differently.

In the illustrated embodiment, the detection circuit section 12 includes a three-phase detection circuit 121 for detecting the phases of the three-phase waveforms induced by the three-phase winding 22. A synchronization detection circuit 122 detects a synchronization signal out of the phase signals from the three-phase detection circuit 121 to control the rotational speed of the engine 20. A DC voltage detection circuit 123 detects the voltage level smoothed by the voltage stabilizing circuit 112. The detection circuit section 12 also includes a detection resistor 124 preferably connected in series to the output line Lo and having a resistance suitable for detecting the AC output current. An electric current detection circuit 125 detects an electric current based on the voltages at both ends of the detection resistor 124. Additionally, an output voltage detection circuit 126 detects the voltage of the AC output from the output line Lo, and a zero-crossing detection circuit 127 detects a zero-crossing on the voltage waveform of the AC output from the output line Lo and communicates a timing signal of the detected zero-crossing to the operation control unit 13. In a preferred embodiment, the zero-crossing detection circuit 127 can detect a zero-crossing on the voltage waveform of the AC output from another inverter type AC generator 1' already in operation prior to the start-up of the inverter type AC generator 1. In turn, while both the inverter type AC generators 1, 1' operate in parallel, the zero-crossing detection circuit 127 can detect a zero-crossing on a composite voltage waveform of both AC outputs from the inverter type AC generators 1, 1'.

As shown in FIG. 1, the operation control unit 13 includes a phase control unit 131 having a Central Processing Unit (CPU) for generating and communicating a timing signal to allow the DC conversion circuit 111 to convert a required level of DC output based on the detection results from the three-phase detection circuit 121 and the DC voltage detection circuit 123. The operation control unit 13 also includes a drive circuit 132 for generating a gate signal, which can be adjusted to a required width based on the timing signal received from the phase control unit 131, and for communicating the gate signal to each thyristor of the DC conversion circuit 111. A main control unit 133, which includes a CPU for processing the detection results from each detection circuit section according to a control program, generates and outputs a signal for controlling the operation of the inverter circuit 113, as well as generates and communicates a regulation signal to the throttle opening regulating unit 201. In a preferred embodiment, a storage unit 134 connects to the main control unit 133 and includes a ROM for storing each control program for conducting operations, as well as various data (including data tables) for activating the programs, and also includes a RAM for temporarily storing the data being processed. However, the storage unit 134 can include other suitable storage mechanisms.

The operation control unit or controller 13 also includes a drive signal generating circuit 135 generates a drive signal based on the timing signal it receives from the main control unit 133. Additionally, a FET drive circuit 136 generates and outputs a gate signal to drive the FET of the inverter circuit 113 upon receiving the drive signal from the drive signal generating circuit 135. An operation amplifier 137 compares a current value of the AC power to a given reference current value and communicates a comparison result to the drive signal generating circuit 135. The operation control unit 13 also includes a control power source unit 138 for obtaining power from the auxiliary winding 23, as required, to ensure sufficient power to operate the phase control unit 131 and the main control unit 133.

Figure 4:
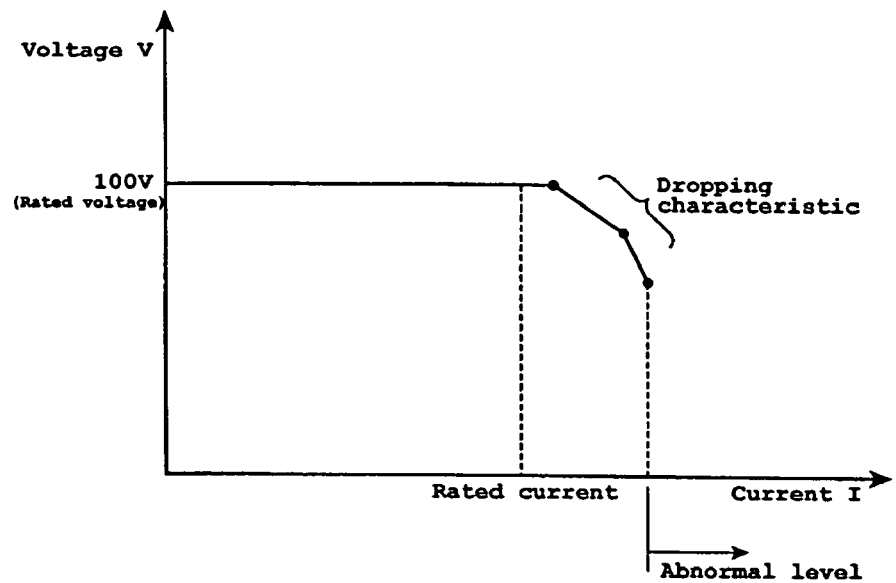
FIG. 4 is a graph of load current versus voltage having a drop-off or fall-off characteristic for the inverter type AC generator in FIG. 1.
Figure 5:
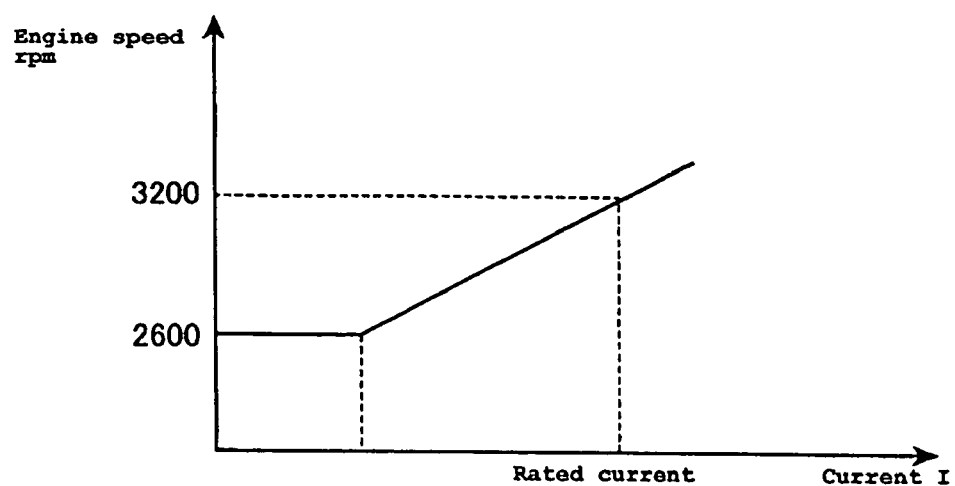
FIG. 5 is a graph of load-current versus engine speed for the inverter type AC generator in FIG. 1.

FIG. 4 shows a graph of an external load characteristics table 1341 (see FIG. 1) having a drop-off or fall-off characteristic, which indicates a relationship between AC output current (load current) and voltage. FIG. 5 shows a graph of a load current-engine speed table 1342 (see FIG. 8), which indicates a relationship between AC output current (load current) and engine speed, and which is preferably stored in the storage unit 134. When a detected current exceeds the reference current value (e.g. a maximum current while the drop-off characteristic appears as shown in FIG. 4), the operation amplifier 137 preferably outputs an abnormality signal to the drive signal generating circuit 135 to forcibly stop hardware operation thereof.

In a preferred embodiment, the storage unit 134 includes at least the external load characteristics table 1341, having the drop-off characteristic in FIG. 4, and the load current-engine speed table 1342 in FIG. 5, both as programs. In addition, the storage unit 134 preferably includes a program memory area for storing an operation control program and a frequency selection program. The storage unit 134 can use a flag, for example, to record the operating conditions of the inverter type AC generator 1, whether or not it operates dependent on, and in parallel with, another inverter type AC generator 1'. Further, the storage unit 134 preferably stores given predetermined frequencies, such as, for example 50 Hz and 60 Hz in Japan, as reference values. This information can be used, for example, to monitor parallel operation conditions, as discussed below.

In at least one embodiment, as shown in FIG. 2, the main control unit 133 can include an operation initializing unit 1331 for the engine 20, a timer unit 1332, a determination unit 1333 for determining the number of zero-crossings, a synchronization processing unit 1334, a normal processing unit 1335 for the single operation of the inverter type AC generator 1, an operation condition (e.g., parallel or single) monitoring unit 1336, an engine speed control unit 1337, and an overvoltage processing unit 1338. However, the components of the main control unit 133 depend on the control program that is used. Therefore, the main control unit 133 can include more or fewer components than those shown in FIG. 2. In one embodiment, a synchronization processing function may also be applied for parallel operations, which can be conducted together with the control program, in part, during the frequency selection process.

In a preferred embodiment, the operation initializing unit 1331 in the main control unit 133 allows start-up of the engine 20 via activation of a start button or ignition (not shown) to activate the control power source unit 138. When a CPU for the main control unit 133 starts-up, the operation initializing unit 1331 preferably fully opens the throttle valve first while communicating a control signal to the throttle opening regulating unit 201 to regulate the throttle valve to a predetermined opening.

The timer unit 1332 preferably measures a required time period for stabilizing the operation of the main control unit 133 after it starts-up, and measures a given predetermined time period TO for allowing zero-crossing detection operations.

The determination unit 1333 for determining the number of zero-crossings preferably determines whether or not the detection of zero-crossings for the AC output on the output line Lo (or for the AC output from another inverter type AC generator 1' already in operation if the inverter type AC generator 1 has not yet started-up) meets a predetermined condition for commencing parallel operations. Such a predetermined condition can be, for example, whether or not the zero-crossing is detected a certain number of times (e.g., if the zero-crossing has been detected a total of five times).

In the illustrated embodiment, the synchronization unit 1334 preferably allows an internal counter of the main control unit 133 to measure the detected timing for the zero-crossing and the time interval between any two sequentially detected zero-crossings, in order to determine a cycle (frequency) of the AC output. The synchronization unit 1334 then implements the process for both the phase and frequency of the AC output from the inverter type AC generator 1 to correspond to the phase and frequency, determined based on the detected zero-crossings on the AC output, from another inverter type AC generator 1' (synchronization preparation process). That is, the phase and frequency for the drive signal to be generated are preset, and a drive control signal to the drive signal generating circuit 135 is output according to the phase and frequency obtained through the synchronization preparation process. Therefore, the drive signal preset in the synchronization preparation process is generated so that the inverter circuit 113 can generate AC output of a waveform in synchronization with the AC output from another AC generator 1'. The synchronization preparation process refers to a process in the synchronization processing unit 1334, which preferably includes comparing the phase (timing) and frequency, either calculated for each cycle or averaged, for the AC output on the output line Lo with the assumed phase and frequency for the drive control signal to be generated. The synchronization preparation process also preferably includes regulating the timing and cycle (frequency) for the AC output by changing the timing at which the internal clock starts the count, as well as the number of clocks, in order to compensate for the differential between the AC output and the drive control signal that is to be generated.

With continued reference to FIG. 2, the normal processing unit 1335 for single operation communicates the drive control signal independently generated by the normal processing unit 1335 when the other inverter type AC generator 1' ceases operation or is disconnected from the inverter type AC generator 1 (e.g., when parallel operations end). For example when two AC generators 1, 1' operate in parallel, the normal processing unit 1335 can preferably change the frequency and phase of the inverter type AC generator 1 to required values in the event that the other inverter type AC generator 1' discontinues operation. However, in one embodiment, the inverter type AC generator 1 can preferably continue single operation at the same frequency present immediately before the end of the parallel operations, or at the reference frequency immediately before the end of parallel operations.

The operation condition (parallel or single) monitoring unit 1336 preferably determines the operation conditions based on the zero-crossing detection results, or based on a frequency of the composite waveform of the AC outputs from both inverter type AC generators 1, 1' and the reference frequency. The reference frequency used for this determination can be, for example, a frequency stored in the storage unit 134 and selected to approximate a frequency obtained from the detected zero-crossings. In some embodiments, the reference frequency can be 50 Hz or 60 Hz.

The engine speed control unit 1337 preferably outputs a regulation signal to the throttle opening regulating unit 201 in order to regulate the engine speed. In one embodiment, the regulation signal depends on the data in the memory table (see FIGS. 4 and 5).

The synchronization process for parallel operations is preferably conducted with the control program including the frequency selection process. In a preferred embodiment, a program for selecting and presetting a frequency to the required value is stored in the storage unit 134 in advance in order to implement the process to select a frequency closest to the one obtained based on the timing interval of the zero-crossings. Also, the control program corresponding to the selected frequency is preferably activated to generate the drive control signal more effectively, whereby high synchronization accuracy can preferably be achieved in parallel operations. Further details are described with reference to FIGS. 8 and 9.

With continued reference to FIG. 2, if the DC voltage detection circuit 123 (see FIG. 1) detects a voltage greater than or equal to a certain voltage level, the overvoltage processing unit 1338 preferably stops the main control unit 133 from communicating the drive control signal and stops the inverter circuit 113 from outputting AC power. The overvoltage processing unit 1338 also preferably sends a signal from the main control unit 133 to an informing unit, such as a display device (not shown) to communicate the cessation of the drive control signal and AC power.

FIG. 3 shows a specific configuration of the inverter type AC generator 1, in accordance with one embodiment. In the illustrated embodiment, the DC conversion circuit 111 is made up of a series of circuits, which include a thyristor and a diode for each phase. The DC conversion circuit 14 preferably performs full-wave rectification by inputting, repeatedly for every cycle, a gate pulse subjected to the timing control for each phase from the drive circuit 132 to a thyristor gate.

As shown in FIG. 3, the inverter circuit 113 preferably includes four switching devices, each formed by a rectification diode and an FET connected in parallel each other, which are connected in bridge mode. The inverter circuit 113 can preferably convert DC voltage into AC output by alternately turning on and off the two pairs of diagonally arranged FETs, based on the gate pulse or gate signal (drive signal) from the drive circuit 136. The synchronization processing unit 1334 preferably communicates the drive control signal or gate signal to the two pairs of diagonally arranged FETs in the inverter circuit 113 via the main control unit 133 and the drive signal generating circuit 135 at the same timing as the zero-crossing and at a timing corresponding to a ½ cycle thereof. Preferably, PWM control for modulating a duty cycle or pulse width of the gate signal, depending on the detection levels of the current detection circuit 125 and the output voltage detection circuit 126, allows adjustment of the AC output to a desired level (e.g. rated voltage of 100V or 200V).

As shown in FIG. 3, the filter circuit 114 includes an LC circuit and is designed to smooth a square wave output from the inverter circuit 113 into a sine wave to be output to the output line Lo as the AC output.

Figure 6:
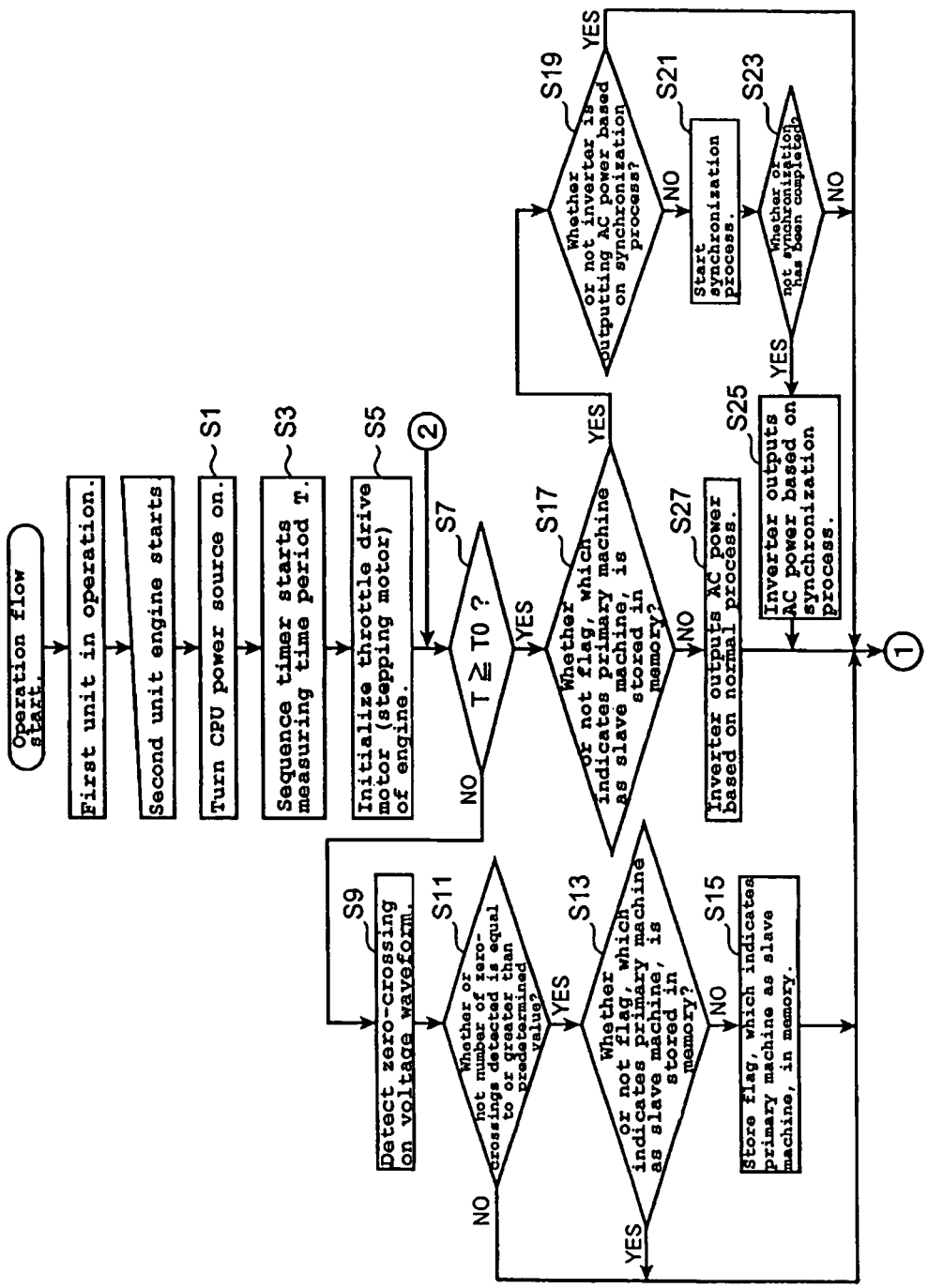
FIG. 6 is an operation flowchart for single frequency operations of the inverter type AC generator in FIG. 1.
Figure 7:
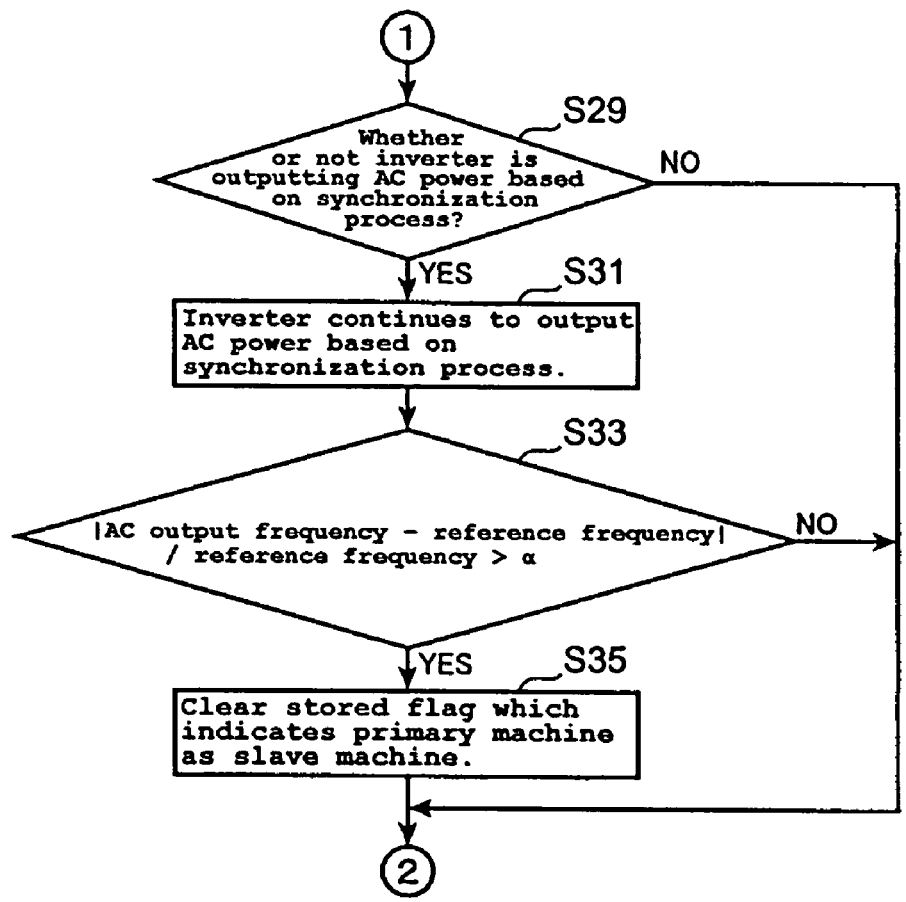
FIG. 7 is an operation flowchart for single frequency operations of the inverter type AC generator in FIG. 1.
Figure 8:
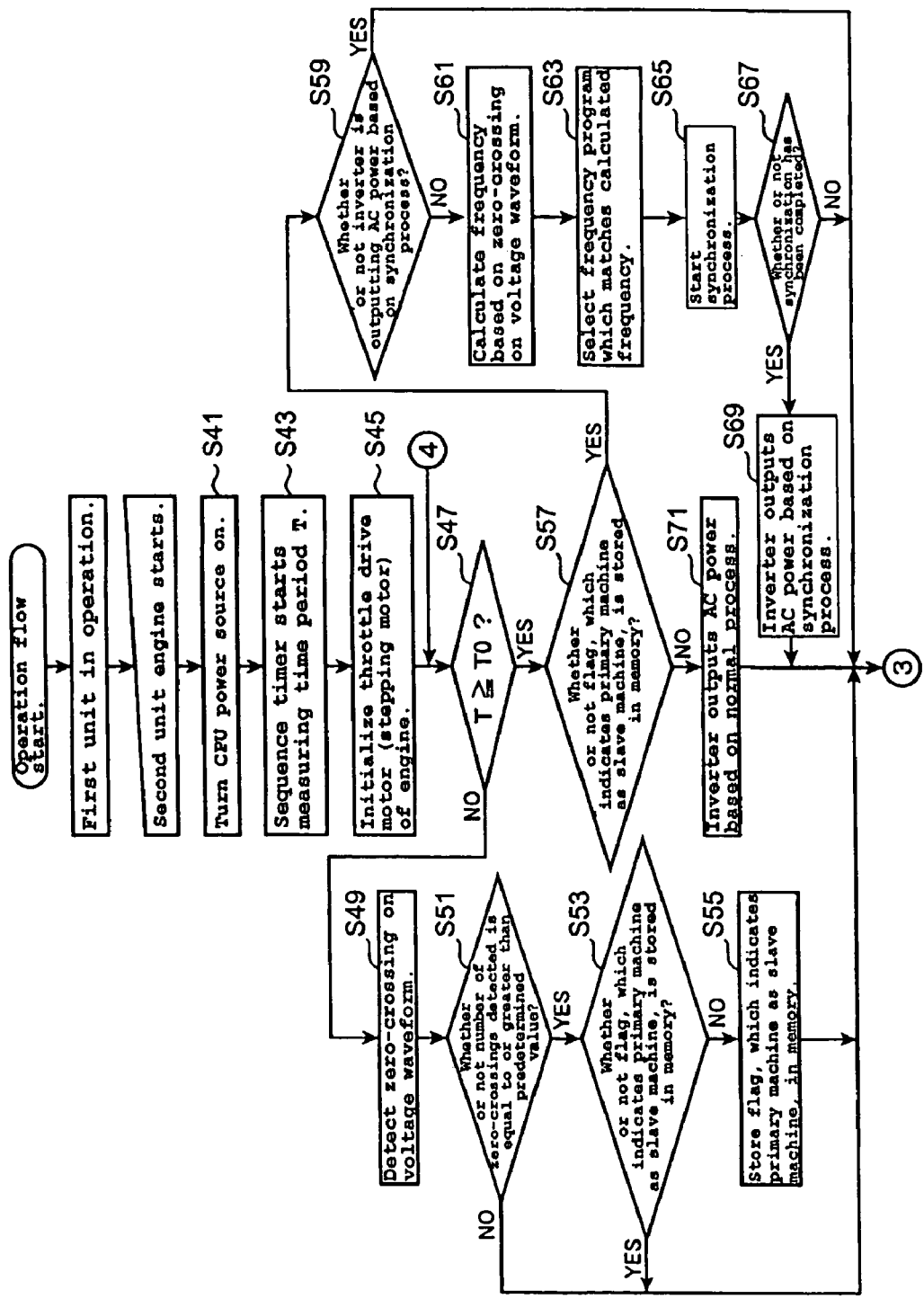
FIG. 8 is an operation flowchart for multi-frequency operations of the inverter type AC generator in FIG. 1.
Figure 9:
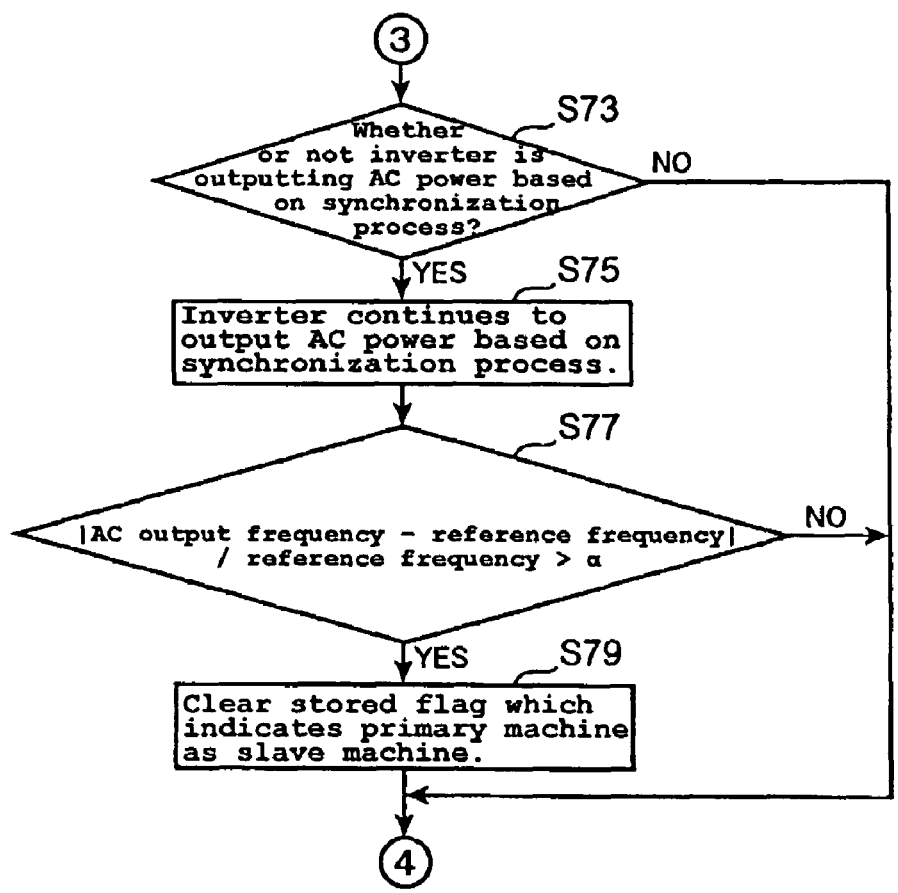
FIG. 9 is an operation flowchart for multi-frequency operations of the inverter type AC generator in FIG. 1.

Next, FIGS. 6 to 9 show flowcharts for the operation of the inverter type AC generators. FIGS. 6 and 7 illustrate single-frequency operations, while FIGS. 8 and 9 illustrate multi-frequency operations.

FIGS. 6 and 7 apply, for example, to a situation where the inverter type AC generator 1 (second unit) starts operation in parallel to another inverter type AC generator 1' (first unit) that has been in operation. Initially, the connecting member Po for the output line Lo is connected to the load (not shown). Then, the operation of the engine 20 for the second unit begins. Following engine start, the power source from the control power source unit 138 is activated so that the CPU in the main control unit 133 starts-up (step S1). This allows a sequence timer to start measuring a time period T (step S3). Further, a control signal for regulating the throttle valve is communicated to the throttle opening regulating unit 201 as part of the operation initialization process for the engine 20 (step S5).

With continued reference to FIGS. 6 and 7, a determination is made for several seconds, e.g., two seconds, whether or not the time period T is equal to or greater than a predetermined start-up time period T0 (step S7). If the determination is NO, that is, the time period T is not equal to or greater than the predetermined time period T0, the process detects the zero-crossing on the voltage waveform of the AC output (step S9). Then, a determination is made whether or not a condition for starting parallel operations is met (step S11). Such a condition can be, for example, that the number of zero-crossings detected is equal to or greater than a predetermined value, e.g. five. If the determination is NO, that is, if the number of zero-crossings detected is below the predetermined value, the process goes back to step S7 via step S29 discussed below. On the other hand, if the determination is YES, that is, if the number of zero-crossings detected reaches the predetermined value, a determination is made whether or not a flag, which indicates the inverter type AC generator 1 (primary machine) as a slave machine for the first unit, is stored in the storage unit 134 (step S13). If the determination is NO, that is, if such flag is not stored in the storage unit 134, then the flag, which indicates the inverter type AC generator 1 as a slave machine, is stored in the storage unit 134 (step S15). Then, the process goes back to step S7 via step S29 discussed below.

Within the time period T0, the loop, in which the determination is repeatedly NO in step S7 and step S29, is executed. In step S13, if the determination is YES, that is, if the flag that indicates the inverter type AC generator 1 as a slave machine is stored in memory so that the number of zero-crossings detected exceeds the predetermined value, then the process skips step S15 and returns to step S7 via step S29. In one embodiment, this process is repeatedly performed.

If the determination in step S7 is YES, that is, if the time period T is equal to or greater than T0, a determination is made whether or not the flag, which indicates the inverter type AC generator 1 as a slave machine, is stored in memory (step S17). If the determination in step S17 is YES, a determination is made whether or not the inverter is already outputting AC power based on the synchronization process (step S19). If the determination in step S19 is YES, the process goes to step S29. Alternatively, if the determination is NO, then the synchronization process starts (step S21), that is, the aforementioned synchronization preparation process is implemented. Then, a determination is made whether or not the synchronization preparation process has been completed (step S23). If the determination is NO, that is, the synchronization preparation process has not been completed, the process goes to step S29. If the determination is YES (i.e., the synchronization preparation process has been completed), then the drive control signal is outputted to the drive signal generating circuit 135 based on the synchronization process (step S25). This allows the inverter circuit 113 to output AC power.

With continued reference to FIG. 7, a determination is made whether or not the inverter is outputting AC power based on the synchronization process (step S29). If parallel operations have not begun, or if the determination is NO in step S29, then the process returns to step S7, as described above. In contrast, if the inverter is determined to be outputting AC power based on the synchronization process, or parallel operations continue per step S25, then the inverter continues to output AC power based on the synchronization process (step S31). In the synchronization process, the zero-crossing timing is sequentially detected based on the composite voltage waveform of AC output from the output line Lo in order to calculate the frequency.

A differential is calculated between the zero-crossing frequency, obtained by detecting the zero-crossings of the composite voltage waveform of the AC output from the output line Lo, and the reference frequency, which is selected to approximate this zero-crossing frequency. A determination is made whether or not a value obtained by dividing the aforementioned differential by the reference frequency exceeds a predetermined threshold α (step S33), e.g. 1% in this embodiment. If the determination is NO, that is, the value does not exceed the predetermined threshold α, the process goes to step S7. Since the time period T has exceeded T0 at this, point in time, the process goes to step S17. If the flag, which indicates the inverter type AC generator 1 as a slave machine, is stored in memory, or the inverter type AC generators 1, 1' operate in parallel, the determinations in steps S19 and S29 are YES, respectively, so that the parallel operations are maintained. On the other hand, if the determination is YES in step S33, that is, the value exceeds the predetermined threshold α, the program determines that the first inverter AC generator unit 1' has stopped its operation and clears (e.g., resets) the flag stored in the storage unit 134 that indicates the inverter type AC generator 1 as a slave machine (step S35). The process then returns to step S7. Since the time period T exceeds T0 at this point in time, the process goes on to step S17. Then, the determination is NO in step S17, which switches the inverter to output AC power based on the normal process in step S27, thus shifting from the synchronization process to the normal process. This loop is repeated so that the second inverter AC generator unit 1 is now in single operation and continues the normal operation process.

Once the operation mode of the second unit is changed to the normal single operation mode in step S27, the single operation mode is maintained even if the first AC generator unit starts operation, using its built-in control program that is the same as those shown in FIGS. 6 and 7.

FIGS. 8 and 9 apply, for example, to a situation where the inverter type AC generator 1 (second unit), which preferably gives higher priority to the 50 Hz frequency than the 60 Hz frequency, starts operation in parallel with another inverter type AC generator 1' (first unit) in operation at 60 Hz. In another embodiment, the inverter type AC generator 1 can give higher priority to a frequency of 60 Hz, and in turn, the frequency, at which the inverter type AC generator 1' operates could be 50 Hz. In other embodiments, the inverter type AC generators 1, 1' can operate at other frequencies.

Initially, the connecting member Po for the output line Lo is connected to the load (not shown). Then, the engine 20 for the second unit is started. Following engine start, the power source from the control power source unit 138 is activated so that the CPU in the operation control unit 133 starts-up (step S41). This allows a sequence timer to start measuring a time period T (step S43). Further, a control signal for regulating the throttle valve is communicated to the throttle opening regulating unit 201 as part of the operation initialization process for the engine 20 (step S45).

With continued reference to FIGS. 8 and 9, a determination is made for several seconds, e.g., two seconds, whether or not the time period T is equal to or greater than a predetermined start-up time period T0 (step S47). If the determination is NO, that is, the time period T is not equal to or greater than the predetermined time period T0, the process detects the zero-crossing on the voltage waveform of the AC output (step S49). Then, a determination is made whether or not a condition for starting parallel operations is met (step S51), for example, that the number of zero-crossings detected is equal to or greater than a predetermined value, e.g. five. If the determination is NO, that is, if the number of zero-crossings detected is below the predetermined value, the process goes back to step S47 via step S73 discussed below. On the other hand, if the determination is YES, that is, the number of zero-crossings detected reaches the predetermined value, a determination is made whether or not a flag, which indicates the inverter type AC generator 1 (primary machine) as a slave machine, is stored in the storage unit 134 (step S53). If the determination is NO, that is, if such flag is not stored in the storage unit 134, then the flag, which indicates the inverter type AC generator 1 as a slave machine, is stored in the storage unit 134 (step S55). Then, the process goes back to step S47 via step S73 discussed below.

Within the time period T0, the loop, in which the determination is repeatedly NO in step S47 and step S73, is executed. In step S53, if the determination is YES, that is, if the flag that indicates the inverter type AC generator 1 as a slave machine is stored in memory so that the number of zero-crossings detected exceeds the predetermined value, then the process skips step S55 and returns to step S47 via step S73. In a preferred embodiment, this process is repeatedly performed.

If the determination in step S47 is YES, that is, if the time period T is equal to or greater than T0, a determination is made whether or not the flag, which indicates the inverter type AC generator 1 as a slave machine, is stored in memory (step S57). If the determination in step S57 is YES, a determination is made whether or not the inverter is already outputting AC power based on the synchronization process (step S59). If the determination in step S59 is YES, the process goes to step S73. Alternatively, if the determination is NO, then the synchronization process starts. The frequency is initially calculated based on the zero-crossings (step S61). In embodiments where the first unit is in operation at a frequency of 60 Hz, the calculated frequency is assumed to be approximately 60 Hz. Next, the selection process (in the operation program) is implemented for selecting a frequency which matches or corresponds to the calculated frequency (60 Hz, rather than 50 Hz, in this case) (step S63) to communicate a command to start the synchronization process (step S65). A determination is made whether or not the synchronization preparation process has been completed and the command to start the synchronization process has been given (step S67). If the determination is NO, that is, the synchronization preparation process has not been completed or the command to start the synchronization process has not been given, the process goes to step S73. In contrast, the determination is YES then the drive control signal is communicated to the drive signal generating circuit 135 based on the synchronization process (step S69). This allows the inverter circuit 113 to output AC power.

With continued reference to FIG. 9, a determination is made whether or not the inverter is outputting AC power based on the synchronization process (step S73). If parallel operations have not begun, or if the determination is NO in step S73, then the process returns to step S47, as described above. In contrast, if the inverter is outputting AC power based on the synchronization process, or parallel operations continue per step S69, then the inverter continues to output AC power based on the synchronization process (step S75). In the synchronization process, the zero-crossing timing is sequentially detected based on the composite voltage waveform of AC output from the output line Lo in order to calculate the frequency.

A differential is calculated between the zero-crossing frequency, obtained by detecting the zero-crossings of the composite voltage waveform of the AC output from the output line Lo, and the reference frequency, which is approximate to this zero-crossing frequency. A determination is made whether or not a value obtained by dividing the aforementioned differential by the reference frequency exceeds a predetermined threshold α (step S77), e.g. 1% in this embodiment. If the determination is NO, that is, the value does not exceed the predetermined threshold α, the process goes to step S47. Since the time period T has exceeded T0 at this point in time, the process goes to step S57. If the flag, which indicates the inverter type AC generator 1 as a slave machine, is stored in memory, or the inverter type AC generators 1, 1' operate in parallel, the determinations in steps S59 and S73, respectively, are YES so that the parallel operations are maintained. On the other hand, if the determination is YES in step S77, that is, the value exceeds the predetermined threshold α, the program determines that the first unit 1' has stopped operation and clears (e.g., resets) the flag stored in the storage unit 134 that indicates the inverter type AC generator 1 (second unit) as a slave machine (step S79). The process then returns to step S47. Since the time period T exceeds T0 at this point in time, the process goes on to step S57. Then, the determination is NO in step S57, which discontinues the synchronization operation and switches the inverter to output AC power based on the normal process with the frequency maintained at 60 Hz, thereby shifting from the synchronization process to the normal process. This loop is preferably repeated so that the second inverter AC generator unit 1, now in single operation, continues the normal operation process.

In one embodiment, once the operation mode of the second unit is changed to the normal single operation mode in step S71, the single operation mode is maintained even if the first AC generator unit 1' resumes operation, using its built-in control program that is the same as those shown in FIGS. 8 and 9.

In embodiments where the first and second AC generator units 1, 1' both can be operated at respective plural frequencies, or that at least the second unit 1 can be operated at plural frequencies, the second unit 1 can start operation independent of the preset frequency for the first unit 1'. This is because the frequency of the second unit 1, which is dependent on the first unit 1', and starts operation following the first unit 1', is automatically matched to the frequency of the first unit 1' even though the frequency of the second unit 1 is preset different from the frequency of the first unit 1' for their parallel operations. Further, where the first unit 1' stops operation, the second unit 1 can automatically maintain operation as appropriate according to a frequency specific to the load, since the second unit 1 is designed to continue operation at the unchanged frequency.

Before parallel operations begin, a signal to be synchronized to the timing and cycle of the detected zero-crossings is preset by the main control unit 133 and the drive signal is outputted at the time of complete synchronization, thereby starting the operation of inverter. Therefore, no cross current flows-in immediately after parallel operations start so that the load can be supplied with a load current of appropriate AC waveform.

With reference to the embodiments discussed above, the operation control unit advantageously regulates a cycle of a drive signal that is generated such that it coincides with the cycle of the calculated zero-crossing (frequency), and further regulates the timing for producing the drive signal such that the timing matches the timing of the detected zero-crossings. In other words, the synchronization preparation process is performed to synchronize both the cycles (frequencies) and phases of the inverter type AC generators 1, 1'. When the synchronization preparation process has been completed, the operation controller generates the drive signal to be output to the inverter. That is, the drive signal for driving the inverter is synchronized with the zero-crossing timing and frequency before the inverter is in operation. This allows the AC output of the inverter in operation to be connected in parallel to the output line of another inverter type AC generator that has already been in operation. The inverter generates AC output in synchronization with the drive signal. Starting the synchronized operation process in such a manner can supply the load with a high-quality AC output waveform from the start of the parallel operations until parallel operations stop. Thus, the load can achieve proper operation. Further, in order to start the synchronized operation, the drive signal is output to the inverter, unlike in the conventional art, which employs a means for turning the switch on. Thus, the parallel operations can reliably start at a correct zero-crossing timing. This prevents excessive surge current from occurring at the start of the parallel operations and therefore ensures a long service life for products.

Additionally, there is no need to sequentially calculate the cycle (frequency) based on the zero-crossing timing. As described above, the inverter type AC generator can operate in parallel with another generator by automatically operating at the frequency value of the other generator. This can provide an easy-to-use generator independent of the frequency value of another generator. Plural preset frequencies can include 50 Hz and 60 Hz, used, for example, in Japan. However, additional control programs corresponding to frequencies used in foreign countries may be established as required.

As described above, in the case that operation of one of the generator units is discontinued while the inverter AC generators are operating in parallel, the frequency of the AC output normally decreases gradually during a transition period or until another generator stops, e.g., by the time another generator shifts to low-speed operation and stops during this transition period. Because of such a decrease in the frequency (cycle) of the AC output, a variation in the frequency exceeds a predetermined threshold. This allows the inverter type AC generator to advantageously smoothly shift to a single operation mode through the normal operation process. As previously noted, the AC output frequency in the parallel operation modes refers to a zero-crossing frequency of a composite waveform of the AC output from the inverter type AC generators. Monitoring a variation in zero-crossing frequency over time allows detection of the discontinued operation of the inverter AC generator. Various ways may be possible to monitor a variation in frequency of AC output. For example, the zero-crossing frequency initially obtained by the zero-crossing detection means could be determined as a reference frequency. Subsequent to that, a determination could be made whether or not a differential or variable ratio between the reference frequency and a frequency sequentially obtained in the parallel operations exceeds the threshold. Further, a determination may be made whether or not a differential between frequencies sequentially obtained from both generators in parallel operations exceeds the predetermined threshold. If another generator stops, the drive signal preferably continues to be outputted at a frequency for the parallel operations.

Additionally, as discussed above, if no zero-crossings are detected, the inverter type AC generator is not placed in parallel operation mode with another generator, but instead is placed in a single operation mode. This allows the inverter type AC generator to smoothly perform a single operation through the normal operation process.

The following variations, among others, can be employed with the embodiments of the present invention discussed above.

An engine and various other power supply sources may be employed with the DC power generator to drive the inverter AC generator. The embodiments of the present invention may be applicable to any type of power generator or power supply for converting mechanical kinetic energy, produced from energy source other than electricity, into electric energy.

The predetermined condition for parallel operations may include the predetermined number of zero-crossings to be detected, as well as the magnitude of the detected AC output current and voltage.

In the multi-frequency parallel operations, as shown in FIGS. 8 and 9, plural frequency control programs may be prepared, from which an appropriate control program corresponding to the detected frequency can be selected. However, the invention is not limited to this, and a frequency may be sequentially calculated based on the detection results of zero-crossings in order to begin parallel operations, as shown in FIGS. 6 and 7.

In place of the formula in steps S33 and S77, this determination may be simply made based on a differential or ratio between two frequencies. Further, for the aspect of FIGS. 8 and 9, in which activating the control program corresponding to the selected frequency allows parallel operations to start, the determination may also be simply made based on a differential between the zero-crossing frequency and the selected frequency.

The zero-crossing detection and the determination whether or not the number of zero-crossings detected reaches the predetermined value are made within the time period T0. However, a time period for stabilizing the detecting operation may be preset shorter so that the zero-crossing detection can begin immediately after a lapse of this time period.

In the illustrated embodiment, the zero-crossing frequency obtained by detecting the zero-crossings of the composite voltage waveform of the AC output from the output line Lo and the reference frequency approximate to this zero-crossing frequency are used to calculate a differential between the zero-crossing frequency and the reference frequency. Then, a determination is made if the first unit stops operation depending on whether or not a value obtained by dividing the aforementioned differential by the reference frequency exceeds a predetermined threshold α. In other embodiments, such a determination may be made based on a differential or ratio between the zero-crossing frequency and the reference frequency. A variation in the frequency of AC output could also be monitored in a variety of suitable manners, other than using the reference frequency. For example, other manners for monitoring a variation in the frequency of AC output include, but are not limited to: determining whether or not a variation between the previously and currently calculated frequencies exceeds a predetermined threshold, determining whether or not a differential (gradient) between the previously and currently calculated variations exceeds a predetermined threshold, and determining whether or not a differential or ratio relative to a specific value exceeds a predetermined threshold.

In one embodiment, the inverter type AC generator can be used to drive a load, which can be operated at a predetermined frequency, such as water pumps, air conditioners and heaters. In addition, the present invention may also be applied to AC equipment operative at variable frequencies.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An inverter type AC generator for converting DC output from a DC power source generating unit into AC output of a predetermined frequency and capable of supplying the AC output to a load via an output line, comprising:
a zero-crossing detection circuit configured to detect at least one zero-crossing of an AC output waveform on the output line between an AC generating unit and an external load, the AC generating unit comprising an inverter and electrically connected to an AC generator driven at least in part by a power supply unit;
a controller configured to generate a drive signal in synchronization with a timing of the at least one zero-crossing detected by the zero-crossing detection circuit when the at least one detected zero-crossing meets a predetermined condition, the controller configured to drive the inverter via the drive signal to perform a synchronized operation process between the inverter type AC generator and a second inverter type AC generator electrically connectable to the inverter type AC generator; and
a storage unit configured to store a plurality of preset frequencies and a plurality of control programs, the control programs configured to generate drive signals for the plurality of preset frequencies, wherein the controller calculates a frequency of the AC output based on the timing of the at least one zero-crossing detected by the zero-crossing detection circuit, the controller executing one of the plurality of control programs for one of the plurality of preset frequencies stored in the storage unit that corresponds to the calculated frequency to generate the drive signal.

2. The AC generator according to claim 1, wherein the controller discontinues the synchronized operation process when a variation in the frequency of the AC output exceeds a predetermined threshold value, the controller configured to execute a normal operation process to drive the inverter via a drive signal generated based on an internally generated timing signal.

3. The AC generator according to claim 1, wherein the controller executes the normal operation process to drive the inverter based on the internally generated timing signal when the zero-crossing detection circuit does not detect at least one zero-crossing.

4. The AC generator according to claim 1, wherein the predetermined condition is the number of detected zero-crossings.

5. The inverter type AC generator according to claim 1, wherein the second inverter type AC generator operates in parallel with the inverter type AC generator.

6. The inverter type AC generator according to claim 1, wherein the controller is configured to drive the inverter via the drive signal to perform a synchronized operation process, respectively, between a phase and frequency of an AC output waveform of the inverter type AC generator and a phase and frequency of the AC output waveform of the second inverter type AC generator.

7. An inverter type AC generator for converting DC output from a DC power source generating unit into AC output of a predetermined frequency and capable of supplying the AC output to a load via an output line, comprising:
   a zero-crossing detection circuit configured to detect at least one zero-crossing of an AC output waveform on the output line between an AC generating unit and an external load, the AC generating unit comprising an inverter and electrically connected to an AC generator driven at least in part by a power supply unit; and
   means for generating a drive signal synchronized with a timing of the at least one zero-crossing detected by the zero-crossing detection circuit when the at least one detected zero-crossing meets a predetermined condition, said means driving the inverter via the drive signal to perform a synchronized operation process between the inverter type AC generator and a second inverter type AC generator electrically connectable to the inverter type AC generator,
   wherein said means for generating the drive signal includes means for calculating a frequency of the AC output based on the timing of the at least one detected zero-crossing, said means for generating the drive signal also executing one of a plurality control programs for one of a plurality of preset frequencies corresponding to the calculated frequency to generate the drive signal, the plurality of preset frequencies and plurality of control programs stored in a storage unit.

8. The inverter type AC generator according to claim 7, wherein the second inverter type AC generator operates in parallel with the inverter type AC generator.

9. The inverter type AC generator according to claim 7, wherein the controller is configured to drive the inverter via the drive signal to perform a synchronized operation process, respectively, between a phase and frequency of an AC output waveform of the inverter type AC generator and a phase and frequency of the AC output waveform of the second inverter type AC generator.

10. A method for synchronizing the operation of an inverter type AC generator, comprising:
   monitoring a frequency of an AC output waveform, including detecting at least one zero-crossing in the AC output waveform on an output line between an AC generating unit comprising an inverter and an external load;
   calculating a frequency of the AC output based on the timing of the at least one detected zero-crossing; and
   generating a drive signal in synchronization with said frequency when a predetermined condition is met, wherein generating the drive signal comprises executing one of a plurality of control programs for one of a plurality of preset frequencies corresponding to the calculated frequency to generate the drive signal, the plurality of preset frequencies and plurality of control programs stored in a storage unit; and
   driving the inverter of the inverter type AC generator with said drive signal to perform a synchronized operation process between the inverter type AC generator and a second inverter type AC generator electrically connectable to the inverter type AC generator,
   wherein the drive signal is generated in synchronization with a timing of the at least one detected zero-crossing when the detection of the at least one zero-crossing meets the predetermined condition to perform a synchronization process between the inverter type AC generator and the second inverter type AC generator.

11. The method of claim 10, wherein the predetermined condition is the number of detected zero-crossings.

12. The method of claim 10, further comprising:
   discontinuing the synchronized operation process when a variation in the frequency of the AC output exceeds a predetermined threshold value;
   generating the drive signal based on an internally generated timing signal; and
   driving an inverter.

13. The method of claim 12, wherein the inverter is driven based on the internally generated timing signal when the number of detected zero-crossings is zero.

14. The method of claim 10, wherein the second inverter type AC generator operates in parallel with the inverter type AC generator.

15. The method of claim 10, wherein driving the inverter with said drive signal to perform a synchronized operation process includes driving the inverter to perform a synchronized operation process, respectively, between a phase and frequency of an AC output waveform of the inverter type AC generator and a phase and frequency of the AC output waveform of the second inverter type AC generator.

* * * * *

UNITED STATES PATENT AND TRADEMARK OFFICE
CERTIFICATE OF CORRECTION

PATENT NO. : 7,652,900 B2
APPLICATION NO. : 11/350299
DATED : January 26, 2010
INVENTOR(S) : Mitsuo Fukaya and Takashi Uchino It is certified that error appears in the above-identified patent and that said Letters Patent is hereby corrected as shown below:

At column 2, line 14, please delete "frequency,." and insert --frequency,--, therefor.

At column 6, line 2, please delete "TO" and insert --T0--, therefor.

Signed and Sealed this

Twenty-second Day of June, 2010

David J. Kappos
*Director of the United States Patent and Trademark Office*